(12) United States Patent
Filippov

(10) Patent No.: US 11,262,572 B2
(45) Date of Patent: Mar. 1, 2022

(54) AUGMENTED REALITY VISUAL RENDERING DEVICE

(71) Applicant: MEL Science Limited, Amersham (GB)

(72) Inventor: Vasily Filippov, Chalfont St Giles (GB)

(73) Assignee: MEL SCIENCE LIMITED, Amersham (GB)

(*) Notice: Subject to any disclaimer, the term of this patent is extended or adjusted under 35 U.S.C. 154(b) by 0 days.

(21) Appl. No.: 15/628,882

(22) Filed: Jun. 21, 2017

(65) Prior Publication Data

US 2017/0363854 A1 Dec. 21, 2017

Related U.S. Application Data

(60) Provisional application No. 62/352,769, filed on Jun. 21, 2016.

(51) Int. Cl.
| | |
|---|---|
| *G06T 1/00* | (2006.01) |
| *G02B 21/36* | (2006.01) |
| *G09B 5/02* | (2006.01) |
| *G02B 27/02* | (2006.01) |
| *G02B 27/01* | (2006.01) |

(52) U.S. Cl.
CPC ......... *G02B 21/368* (2013.01); *G02B 27/026* (2013.01); *G09B 5/02* (2013.01); *G02B 2027/0141* (2013.01)

(58) Field of Classification Search
CPC ..... G06T 15/005; G06T 19/00; G06T 11/001; G06T 11/40; G06T 11/60
USPC .......................................................... 345/418
See application file for complete search history.

(56) References Cited

U.S. PATENT DOCUMENTS

| | | | |
|---|---|---|---|
| 7,292,251 B1* | 11/2007 | Gu | G02B 21/367 345/555 |
| 8,705,825 B2* | 4/2014 | Olson | G16H 30/40 382/128 |
| 2012/0320094 A1* | 12/2012 | Ruddle | G02B 21/367 345/660 |
| 2015/0269849 A1* | 9/2015 | McGill | G09B 5/02 434/276 |

* cited by examiner

*Primary Examiner* — Gordon G Liu
(74) *Attorney, Agent, or Firm* — Armis IP Law, LLC

(57) ABSTRACT

A visual rendering apparatus such as a telescope, microscope or attached tablet/led displays a magnified subject using the mapped rendering medium, in which the rendering medium includes at least one of actual visual transmissions of the subject and stored, high resolution images of the magnified subject. In an educational context, equipment for displaying true magnified images of, for example, celestial bodies or molecular structures can be beyond reach. Augmented reality provided by supplementing the true, rendered magnified subject with stored images corresponding to successive, higher magnification levels provides effective visualization with common educational tools, avoiding the need for extravagant scientific equipment.

25 Claims, 4 Drawing Sheets

AUGMENTED REALITY VISUAL RENDERING DEVICE

RELATED APPLICATIONS

This application claims the benefit under 35 U.S.C. § 119(e) of U.S. Provisional Patent Application No. 62/352,769, filed Jun. 21, 2016, entitled "AUGMENTED REALITY VISUAL RENDERING DEVICE," incorporated herein by reference in entirety.

BACKGROUND

Magnification apparatus such as telescopes and microscopes, while providing visual insight into scientific phenomena occurring in biological, chemical and astrological fields, become cost prohibitive beyond a certain magnification resolution or level. High resolution microscopes and telescopes tend to be very expensive. In an educational context, the effectiveness of available magnification apparatuses (e.g. microscopes and telescopes) is limited toward the true detail that can be effectively shown or rendered. Affordable microscopes have low resolution and students may not be able to visualize cell structures or inner life using such microscopes.

SUMMARY

Configurations herein are directed to an educational apparatus including a magnification rendering system such as a telescope or microscope for providing a method of displaying a magnified subject, by defining a plurality of magnification levels, such that each magnification level defines a range of magnification, and mapping a received magnification magnitude to one of the of the defined magnification levels. The magnification magnitude is expected to be received from a user control such as a slide lever, dial or potentiometer, and defines a continuous range of scale for the magnification magnitude. Using the magnification magnitude, the approach seamlessly employs a rendering medium corresponding to the magnification level for rendering a display image by transitioning between the rendering mediums when the magnification magnitude crosses a threshold to another magnification level.

The disclosed approach, therefore, provides an augmented or virtual view in response to higher magnification levels. At a magnification level exceeding microscopic analysis, education media is nonetheless rendered, as in showing chemical, biochemical, or molecular level depictions of activity. Moreover, the most complex and intriguing elements of inner cell life such as DNA and RNA proteins is difficult to view even via high resolution microscopes. Further, an additional complexity of using traditional telescopes include difficulty in finding a desired star or celestial body due to the vast area that such a telescope may cover.

Configurations herein are based, in part, on the observation that magnification apparatuses, such as telescopes and microscopes, are often employed in an educational context for viewing magnified subjects such as biological cells and astrological formations. Unfortunately, conventional approaches suffer from the shortcoming that educational environments may not have available sophisticated scientific apparatus for viewing molecular level structures or distal celestial bodies, for example. Electron microscopes and high-power telescopes may be beyond the reach of all but the most advanced research institutions. Accordingly, configurations herein substantially overcome the above described shortcomings by providing an augmented reality magnification device and method that supplements a visually magnified subject with stored high-resolution images of the magnified subject to provide visualization of a greater resolution and magnification than could be provided with the optical magnification enhancement alone.

A visual rendering apparatus such as a telescope, microscope or attached tablet/led displays a magnified subject using the mapped rendering medium, in which the rendering medium includes at least one of actual visual transmissions of the subject and stored, high resolution images of the magnified subject. In an educational context, equipment for displaying true magnified images of, for example, celestial bodies or molecular structures can be beyond reach. Augmented reality provided by supplementing the true, rendered magnified subject with stored images corresponding to successive, higher magnification levels provides effective visualization with common educational tools, avoiding the need for extravagant scientific equipment.

In the disclosed approach, the magnification magnitude represents a continuum of a range and the magnification levels define subranges of the range. The approach includes receiving a user input indicative of the magnification level, and rendering the display image on a user device (telescope, microscope or related screen) in a seamless manner.

The approach detects when the magnification level transitions to a different subrange, and in response, repeats the mapping and rendering the display image according to the remapped rendering medium, therefore transitioning the rendered image to the new rendering medium, such as by switching the true image to a stored higher resolution image of the magnified subject.

In a particular configuration, the magnification levels include two levels, further comprising magnified true images from an optical telescope and high-resolution photographs of an astrological region. Such rendering mediums include astrological images, as might be viewed through a telescope. The approach may also include displaying, with the rendered display image, cues for transitioning to a different magnification level, so as to guide the user toward celestial bodies of interest.

In another configuration, the magnification levels include three levels, further comprising a magnified true image of a microscope slide, high resolution photographs of a microscopic slide, and images of cell biology, and the rendering mediums include previously stored images of molecular level structures, such as might be viewed with a microscope for analyzing biological specimens. The approach includes recognizing, on a microscopic slide, an indicator corresponding to the images of cell biology, such as a bar code or index to the corresponding stored images.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations depicted below present example embodiments of the disclosed approach in the form of educational software in conjunction with a user operable, interactive device. The disclosed configurations include a microscope and telescope as examples only, and are not intended to limit applicable implementations.

Figure 1:
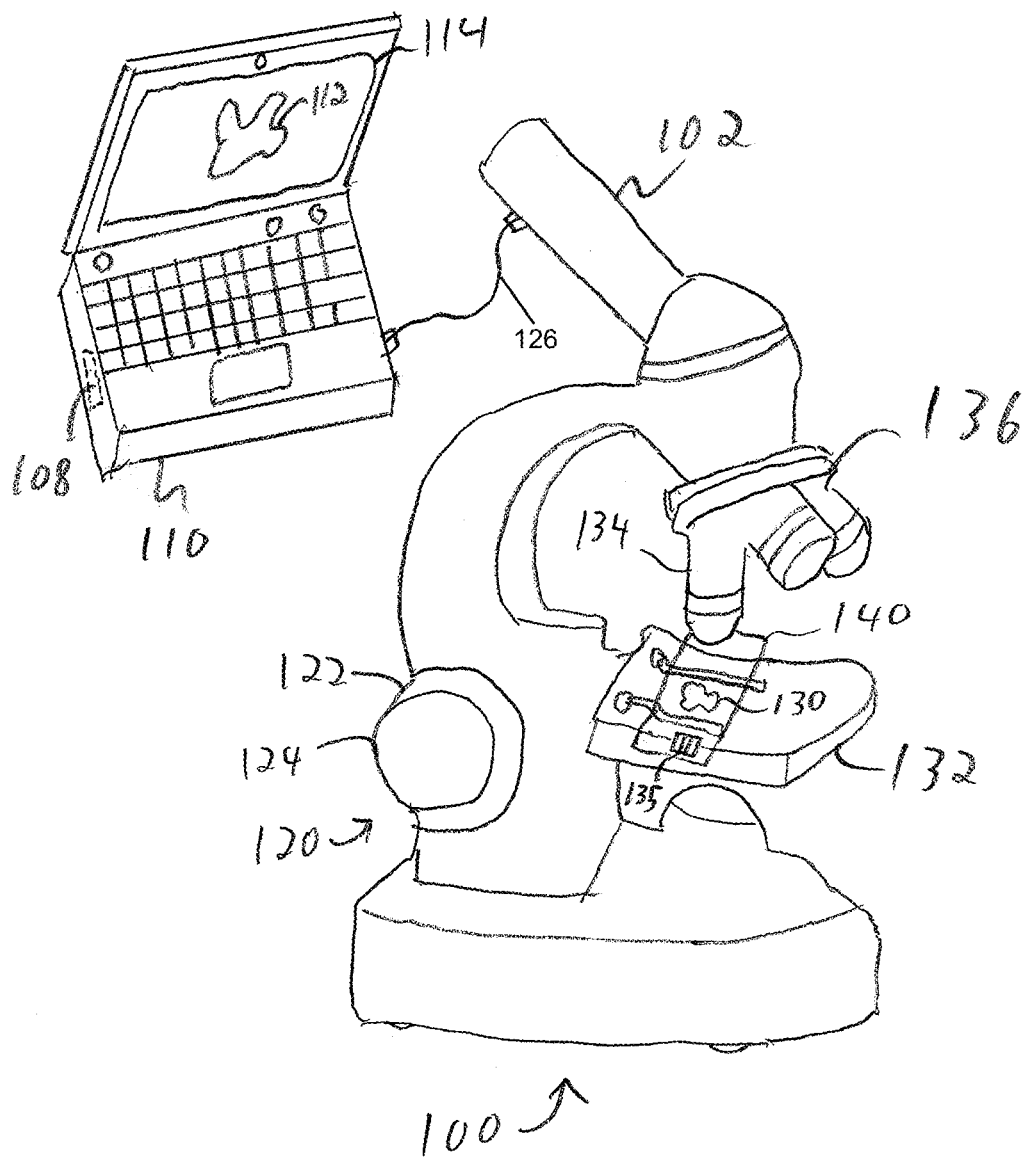
FIG. 1 is a context view of a microscope apparatus suitable for use with configurations herein.

FIG. 1 is a context view of a microscope apparatus suitable for use with configurations herein. Referring to FIG. 1, the microscope 100 is connected to a magnification rendering apparatus 110 for displaying magnification images 112 to a user. The microscope 100 includes a magnification control 120 for selecting a magnitude of magnification to be applied to a magnified subject 130. The magnification may include multiple knobs or slider controls, each defining a continuum or range. A course adjustment 122 makes more abrupt changes in the magnification magnitude, and a fine adjustment 124 allows for more gradual changes to the magnification magnitude. The magnification magnitude is a continuum defining a degree of the magnification, typically expressed as a multiple of image size, e.g. 10×, 100×, 1000×, and so forth.

The microscope 100 includes an interface 126 to the rendering device 110 for transferring and rendering the images 112 on a display 114. Any suitable computing device may perform the rendering, such as a laptop, personal device, phone or smartphone, tablet or desktop. As is known in the art, various computing platforms are available and configurable for processor based rendering. A rendering application 108 launches and executes on the rendering device 110 for displaying the images 112 based on data received from the interface 126.

The microscope 100 may also include an eyepiece 102 for direct visual observation of subject matter on a slide 140, and a stage 132 for supporting the slide 140 beneath a lens 134. The slide 140 also includes an identifier 135 indicative of the subject 130 on the slide, and is referenced via metadata with a database, discussed further below. A plurality of lenses, or objectives, are available for different ranges of magnification. A nosepiece 136 allows rotational engagement of different lenses 134 with the eyepiece. The interface 126 is operable to transmit the magnification magnitude responsive to the selected lens 134 and magnification control 120. The rendering device 110 receives an indication of the magnification magnitude in addition to the images gathered from the slide 140. The rendering application 108 employs a plurality of magnification levels, such that each magnification level defines a range of the magnification.

The rendering application 108 performs a mapping of the magnification magnitude to the defined magnification levels, for providing a virtual supplement to the actual visual images. The rendered images 112, therefore, show resolutions and magnification levels beyond that available in a conventional, low-cost educational microscope. In a biology context, for example, the magnification levels include 3 levels: a magnified true image of a microscope slide, high resolution photographs of a microscopic slide, and images of cell biology, discussed further below.

The rendering device 110 provides a rendering medium corresponding to each of the magnification levels for rendering the display image 112 of a magnified subject 130, disposed on the slide, on a user display based on the magnification magnitude and the mapped magnification level. The magnification level is received via a user input indicative of the magnification magnitude, for rendering the image 112 on a user device, and may be from either the microscope course/fine controls 122/124 or via the rendering device 110.

Figure 2:
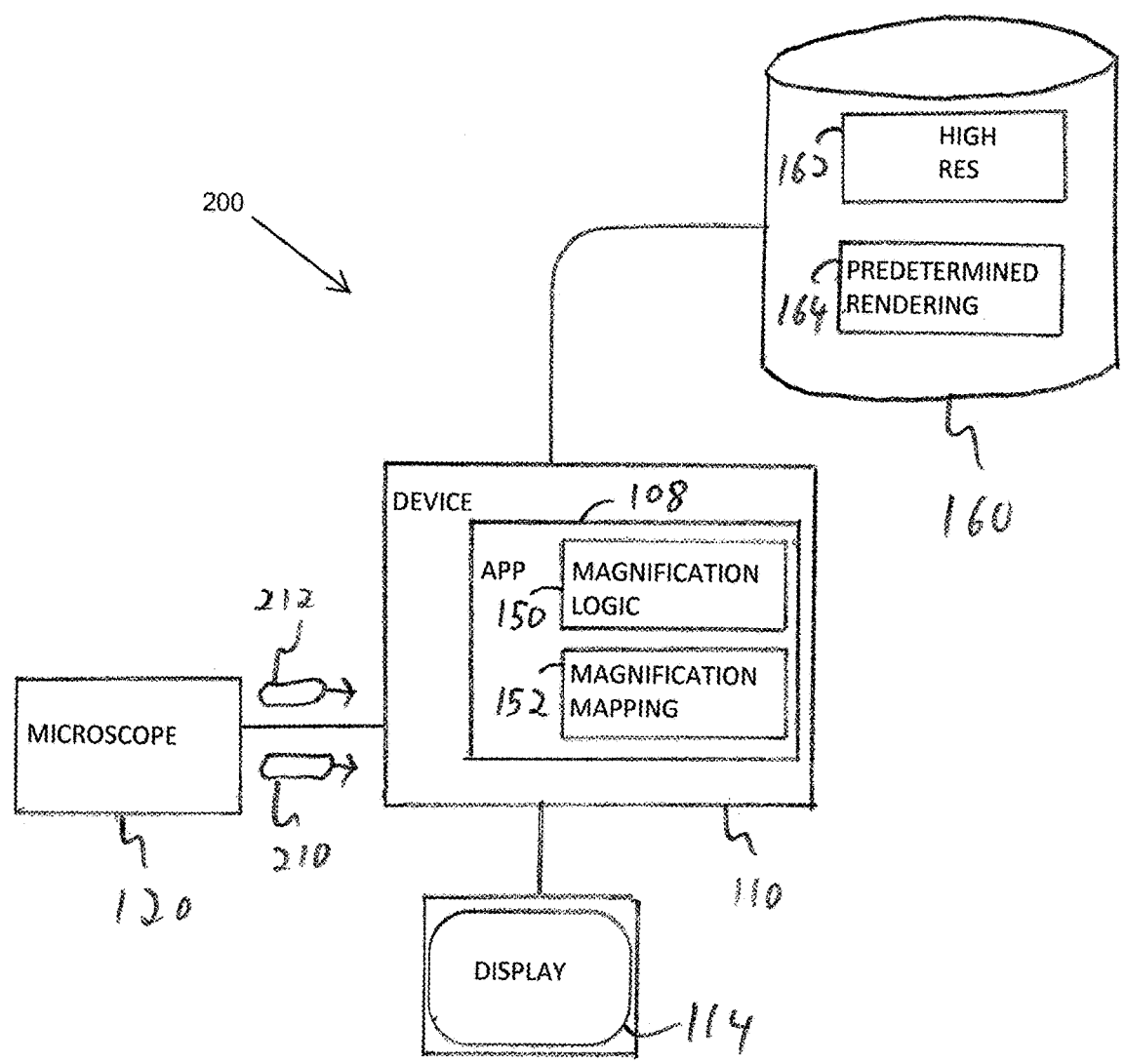
FIG. 2 is a block diagram of operation of the magnification apparatus according to configurations herein.

FIG. 2 is a block diagram of operation of the magnification apparatus according to configurations herein. Referring to FIGS. 1 and 2, a system 200 integrates the visual images 210 and the magnification magnitude 212 received from the microscope for rendering a corresponding virtual magnification level of a magnified subject 130. The rendering device 110 is coupled to a database 160 including high resolution images 162, such as scanning electron microscope (SEM) images of various magnified subjects 130. The database 160 also contains predetermined educational renderings 164 of visual depictions beyond the microscopic level and extending to the chemical and molecular levels. For example, in a viewing of a cell as the magnified subject 130, the predetermined renderings 164 might include pictures or animations of genetic operations including DNA. The application 108 employs magnification logic 150 for comparison with a magnification mapping 152 to map the received magnitude 212 to a magnification level. The display 114 displays a magnified subject using the mapped rendering medium, such that the rendering medium includes at least one of visual transmissions of the subject 130 and stored, high resolution images 162 of the magnified subject. In the example configuration, the renderable media in the database 160 includes images of the subject matter on the slide, such that the images have a greater resolution (magnification) than the subject 130 on the slide 140. Based on the mapped magnification level, the magnification logic 150 will render images 112 from either the received visual image 210, a high resolution microscopic image 162 from the database 160, or a predetermined rendering 164 from the DB 160.

Figure 3A:
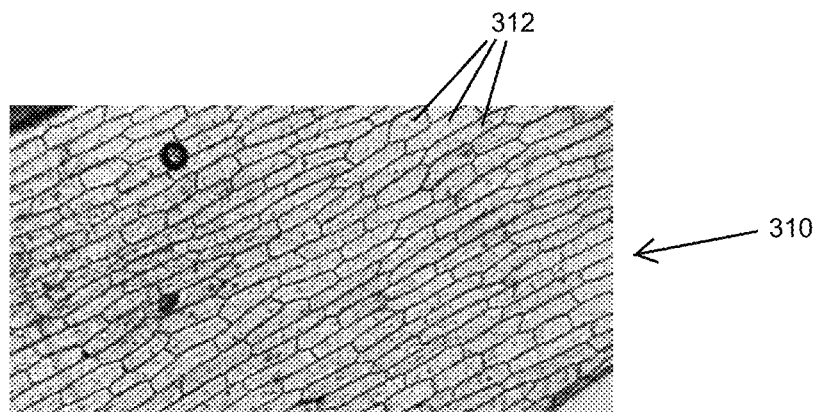
FIGS. 3A-3C are diagrams of specimens according to a plurality of the defined magnification levels as disclosed herein.
Figure 3B:
Figure 3C:
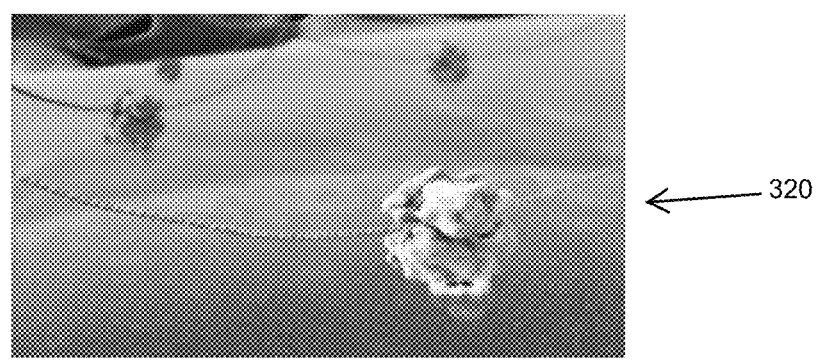

FIGS. 3A-3C are diagrams of specimens according to a plurality of the defined magnification levels as disclosed herein. Referring to FIGS. 2-3C, FIG. 3A represents an actual visual image 210 received by the microscope 100, and shows an interconnection 310 of many cells 312. FIG. 3B represents a high-resolution image from the high resolution storage 162 of the DB 160. This rendering depicts a closer view of a single cell 312. FIG. 3C is retrieved from the predetermined rendering storage 164 of the DB 160, and shows cell internals 320. The predetermined renderings 164 may be any suitable educational media, and are intended to provide insight beyond that viewable with a microscope, such as cell processes and molecular interchanges that may not even be visible with an SEM.

Figure 4:
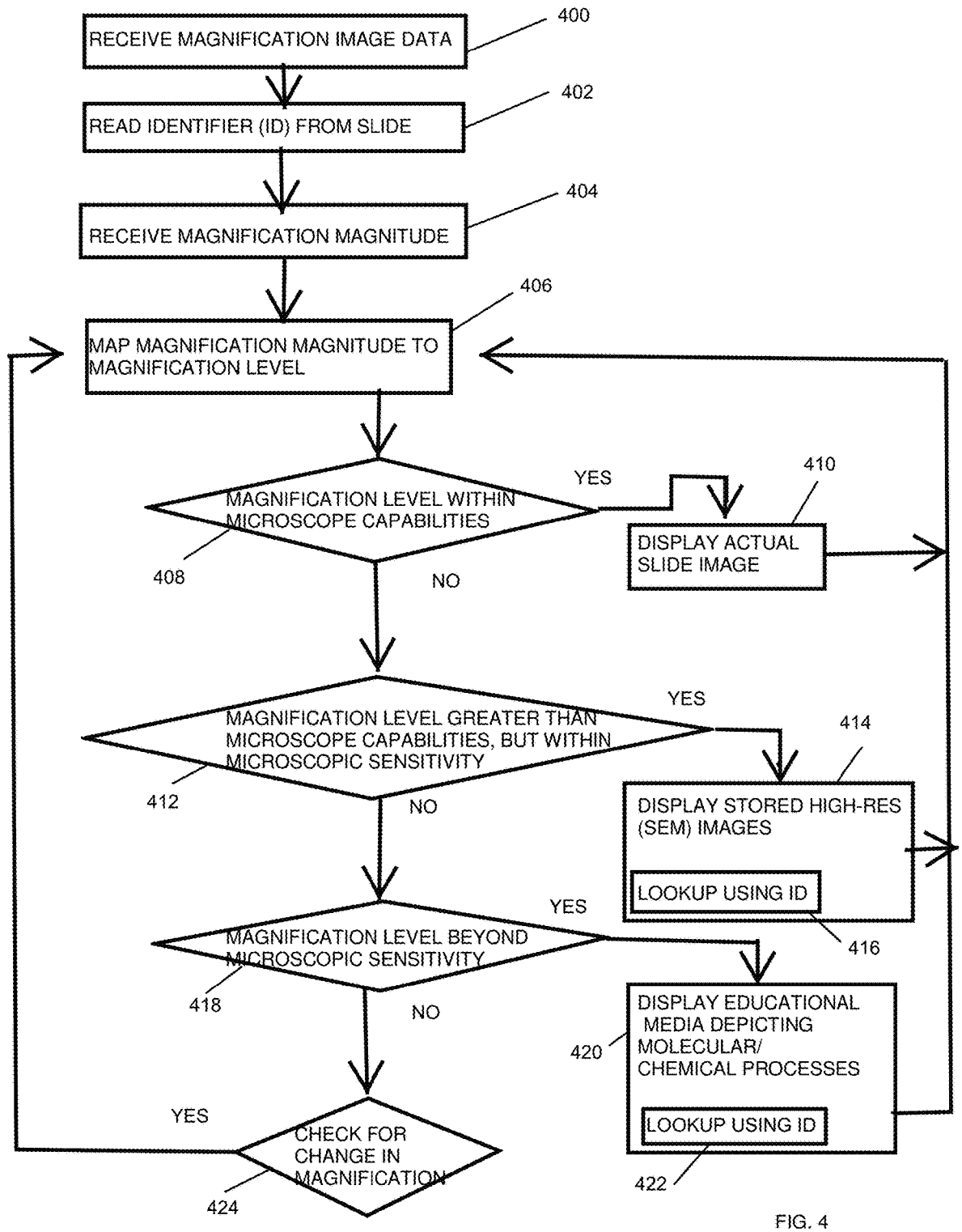
FIG. 4 is a flowchart of microscope operation for rendering the images of FIGS. 3A-3B.

FIG. 4 is a flowchart of microscope operation for rendering the images of FIGS. 3A-3B. Referring to FIGS. 2 and 4, at step 400, the microscope 120 receives a magnification image 210 from the slide 140. The magnification apparatus includes a microscope 100 responsive to slides 140, such that the slides contain visual representations of the subject matter 130 for magnification.

The microscope 120 also reads the identifier 135 in proximity to the subject matter 130, such that the identifier 135 includes metadata pertaining to the subject matter 130, as shown at step 402. The identifier 135 may be in any suitable optically or electronically recognizable form, such as a QR code, bar code, RFID or textual element. The microscope further receives the magnification magnitude 212 based on the user control of the magnification control 120, as shown at step 404. The interface 126 is used to transmit to the device 110 and database 160 of renderable media, in which the database includes renderable media corresponding to the subject matter 130 on the slide 140.

The device 110 executes an app 108 having magnification logic 150 operative to receive the identifier 135 and the metadata as a result of scanning the slide 140, and map, based on the magnification magnitude 212, magnification magnitude to the magnification level based on the magnification mapping 152, as depicted at step 406.

The magnification magnitude represents a continuum of a range, and could be any of a continuous range of values, e.g. from 10× magnification to 10,000× magnification. The magnification levels define subranges of the range for denoting the different rendering sources. At step 408, a check is performed, to determine if the magnification level is within microscope 100 capabilities. If so, then the app 108 displays the actual slide image 210 on the display 114, as shown at step 410.

If the magnification level is greater than microscope capabilities, but within general microscopic sensitivity, as depicted at step 412, then the app 108 references, based on the metadata, the high resolution media corresponding to the slide, as shown at step 414. This includes a lookup in the DB 160 based on the identifier 135 to display stored high resolution (e.g. SEM images) 162 from the DB 160, as disclosed at step 416. This magnification level represents levels that are beyond the capabilities of the student microscope 100, but within the range attainable by higher powered microscopes such as SEM. This provides the user with an experience as if they were employing a higher powered microscope.

At step 418, a check is performed to determine if the magnification level is beyond attainable microscopic sensitivity. In this level, the app 108 displays educational media depicting particular molecular or chemical processes as would be occurring in the context of the slide subject 130, as shown at step 420. The magnification logic 150 performs a lookup of the corresponding predetermined rendering 164 based on the identifier, as depicted at step 422.

During rendering, the app 108 performs a check for a change in the magnification magnitude 212, as shown at step 424, and control reverts to step 406 to remap the magnification level as requested. The application 108 may also display, with the rendered display image 112, cues for transitioning to a different magnification level. At various magnification magnitudes, or driven by time or user manipulations, visual cues such as arrows or shapes may appear to instruct or "hint" that the user view a certain area or region.

The disclosed configuration employs a microscope 100 as the magnification device, however the approach is also applicable to other magnification devices such as a telescope.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a magnification rendering system, a method of displaying a magnified subject, comprising:
    defining a plurality of magnification levels, each magnification level defining a range of magnification;
    scanning an identifier in proximity to the magnified subject, the identifier including metadata pertaining to the magnified subject;
    mapping a received magnification magnitude for indexing to one of the of the defined magnification levels; and
    employing a rendering medium, from among a plurality of rendering mediums, corresponding to the magnification level for rendering a display image; and
    displaying the magnified subject using the mapped rendering medium and the received identifier, the rendering medium including at least one direct visual observation of the subject and stored, high resolution images of the magnified subject;
    wherein the at least one visual transmission includes a showing of an interconnection of a plurality of cells, and
    wherein the at least one visual transmission is a true magnified image of a microscope slide and the indicator resides on the microscope slide that defines at least one of the rendering mediums of the plurality of rendering mediums, the microscope slide for providing the direct visual observation rendering medium.

2. The method of claim 1 wherein the magnification magnitude represents a continuum of a range and the magnification levels define subranges of the range.

3. The method of claim 2 further comprising receiving a user input indicative of the magnification magnitude, and rendering the display image on a user device.

4. The method of claim 2 further comprising detecting when the magnification level transitions to a different subrange, and in response, repeating the mapping and rendering the display image according to the remapped rendering medium.

5. The method of claim 1 wherein the magnification levels include 3 levels, further comprising a magnified true image of a microscope slide, high resolution photographs of a microscopic slide, and images of cell biology.

6. The method of claim 1 wherein a lower magnification level render direct visual observation of the subject matter on the slide.

7. The method of claim 6 wherein the magnification level is in response to a user input specifying the magnification magnitude.

8. The method of claim 1, wherein an actual visual image of the interconnection of the plurality of cells is illustrated.

9. The method of claim 8, wherein the actual visual image does not illustrate an identifier.

10. The method of claim 1 wherein the true magnified image is defined by the magnified subject on the microscope slide and the identifier is proximate to the magnified subject on the microscope slide.

11. The method of claim 1 further comprising transitioning the rendering medium between the direct visual observation and a stored image based on a received level of magnification.

12. A magnification rendering apparatus,
comprising: a magnification control for selecting a magnitude of magnification;
a plurality of magnification levels, each magnification level defining a range of the magnification and responsive to a user input specifying the magnification magnitude;
a mapping of the magnification magnitude for indexing to the defined magnification levels;
a visual eyepiece configured to receive scanned identifier in proximity to the magnified subject, the identifier including metadata pertaining to the magnified subject; and
a plurality of rendering mediums, each rendering medium of the plurality of rendering mediums corresponding a respective one of the magnification levels for rendering a display mage of a magnified subject on a user display based on the magnification magnitude, the received identifier and the mapped magnification level, the rendering medium configured to display at least one direct visual observation of the magnified subject using the mapped rendering medium, the rendering medium including at least one visual transmission of the subject and stored, high resolution images of the magnified subject,
wherein the at least one visual transmission includes a showing of an interconnection of a plurality of cells, and
wherein the at least one visual transmission is a true magnified image of a microscope slide and the indicator resides on the microscope slide that defines at least one of the rendering mediums of the plurality of rendering mediums, the microscope slide for providing a direct visual observation rendering medium.

13. The apparatus of claim 12 further comprising magnification logic for displaying a magnified subject using the rendering medium corresponding to the mapped magnification level, the rendering medium including at least one of visual transmissions of the subject and stored, high resolution images of the magnified subject.

14. The apparatus of claim 13 wherein the magnification apparatus includes a microscope responsive to slides, the slides containing visual representations of subject matter for magnification, further comprising:
an interface to a database of renderable media, the database including renderable media corresponding to the subject matter on the slide.

15. The apparatus of claim 14 wherein the renderable media in the database includes:
images of the subject matter on the slide, the images having a greater resolution than the subject matter on the slide; and
predetermined renderings of educational media based on the subject matter on the slide.

16. The apparatus of claim 14 wherein the identifier is at least one of a QR code, bar code, RFID or textual element.

17. The apparatus of claim 13 further comprising magnification logic operative to:
receive the identifier and the metadata as a result of scanning the slide;
referencing, based on the metadata, the renderable media corresponding to the slide; and
mapping, based on the magnification magnitude, the magnification level; and
rendering, from the database, either the images of the subject matter of the predetermined renderings based on the mapping.

18. A computer program product on a non-transitory computer readable storage medium having instructions that, when executed by a processor, perform a method of method of rendering a magnified interactive image of educational media, the method comprising:
identifying a plurality of magnification levels;
assigning, to each identified magnification level, a rendering medium from a plurality of rendering mediums;
receiving an input indicative of a desired subject for observation;
scanning an identifier in proximity to the magnified subject, the identifier including metadata pertaining to the magnified subject;
receiving an input indicative of a magnification magnitude; mapping the magnification magnitude for indexing to a magnification level and employing the rendering medium corresponding to the indexed magnification level for displaying the desired subject, and
displaying a magnified subject using the mapped rendering medium and the received identifier, the rendering medium including at least one direct visual observation of the subject and stored, high resolution images of the magnified subject,
wherein the at least one visual transmission includes a showing of an interconnection of a plurality of cells, and
wherein the at least one visual transmission is a true magnified image of a microscope slide and the indicator resides on the microscope slide that defines at least one of the rendering mediums of the plurality of rendering mediums, the microscope slide for providing a direct visual observation rendering medium.

19. The computer program product of claim 18, wherein the method further comprises displaying a magnified subject using the mapped rendering medium, the rendering medium including at least one of visual transmissions of the subject and stored, high resolution images of the magnified subject.

20. The method of claim 19 wherein the magnification levels include 3 levels, further comprising a magnified true image of a microscope slide, high resolution photographs of a microscopic slide, and images of cell biology.

21. The method of claim 20 further comprising displaying, with the rendered display image, cues for transitioning to a different magnification level.

22. The method of claim 18 wherein the rendering mediums include previously stored images of molecular level structures.

23. The method of claim 22 further comprising recognizing, on a microscopic slide, an indicator corresponding to the images of cell biology.

24. The method of claim 18 wherein the magnification levels include 2 levels, further comprising magnified true images from an optical telescope and high-resolution photographs of an astrological region.

25. The method of claim 24 wherein the rendering mediums include astrological images.

\* \* \* \* \*